July 6, 1965 B. J. DAVIES 3,193,833

PRODUCING A PROGRAM CONTROL RECORD

Filed Aug. 31, 1962 2 Sheets-Sheet 1

INVENTOR
BEAUMONT J. DAVIES

BY
Holcombe, Wetherill & Brisebois
ATTORNEYS

July 6, 1965 B. J. DAVIES 3,193,833

PRODUCING A PROGRAM CONTROL RECORD

Filed Aug. 31, 1962 2 Sheets-Sheet 2

INVENTOR
BEAUMONT J. DAVIES

BY Holcombe, Wetherill & Brisebois
ATTORNEYS

United States Patent Office 3,193,833
Patented July 6, 1965

3,193,833
PRODUCING A PROGRAM CONTROL RECORD

Beaumont John Davies, Putnoe, England, assignor to George Richards & Company Limited, Altrincham, England, a company of Great Britain Filed Aug. 31, 1962, Ser. No. 220,797
14 Claims. (Cl. 346—8)

This invention relates to methods of producing a programme for a curve-, or contour-, following operation, for example, a milling or other machining operation to produce an article of a desired shape, and one object of the invention is to provide such a method which can be simpler than a method of producing such a programme by computation.

According to the present invention in a curve, or contour-following operation, a follower traces a representation of the curve or contour and the necessary movements of the follower in relation to references are recorded.

Thus, the representation of the desired curve can be drawn on paper, or preformed as a groove in a plastic or metal plate, or as a conducting strip on an insulating plate or as an insulating strip on a conducting plate, and can be traced by the follower in a conventional way, for example by scanning a line photo-electrically, or using a stylus to follow a groove or a conducting probe to follow a conducting line. If the curve or contour is three-dimensional, the follower could be arranged to trace the surface of a solid model, while its necessary movements are recorded.

The recording itself could be on tape. Thus, a punched tape could be formed, but preferably, the recording is a magnetic tape recording for example, a recording consisting of a number of parallel tracks of phase-modulated square waves of the kind described in British patent specification No. 27,148/59. It is clear that other kinds of recording could be made, depending upon the transducers measuring the movements of the follower, and the processing of the transducer signals before they are recorded on tape. For example recorded electrical values could be used to control synchros to reproduce the movements which cause the recorded values to be generated.

In a convenient form of the invention, the follower is supported by a carriage which is moved so that the follower traces the representation and then the components of carriage movement in relation to co-ordinates, for example Cartesian co-ordinates, can be recorded, so that the movement of the carriage can be eventually reproduced by the cutter of a machine tool.

In one arrangement of the invention, the carriage is arranged to be driven and steered so that it follows the path of the curve. The curve is followed by a follower connected to the carriage through a bearing having an axis normal to the plane of the curve being followed and some kind of transducer mounted on the carriage detects the necessary movements of the carriage to keep the follower following the curve.

This kind of arrangement is particularly suitable in machine tool applications where it is convenient to allow for all or part of the cutter radius while following the curve. For this purpose the transducer is arranged to be displaced from the follower in a direction at right angles to the direction of movement of the carriage. This displacement can be made adjustable in accordance with the amount of cutter radius compensation required.

For example, the carriage may carry an arm of adjustable length mounted at right angles to the direction of movement of the carriage, the free end of which arm carries the follower in a vertical bearing. The steering signals cause the arm to rotate as the direction of movement of the carriage changes to adjust the position of the follower to follow the curve. The follower will follow the line of the work piece, while the carriage follows the path which would be followed by the central axis of the cutter as it machined a workpiece according to the curve.

Alternatively, a sub carriage mounted on the carriage may be driven by the follower, the relative motion of the carriage and sub carriage representing the locus of the cutter radius vector. This vector can also be recorded and used on the shop floor to modify the cutter centre path.

In an alternative arrangement the follower is pivoted directly to the carriage and a similarly mounted lever arm moves a similarly mounted sub carriage. The relative movements of carriage and sub carriage are recorded and used as before.

If a three-dimensional surface is to be traced, the follower may be arranged to trace successive curves representing sections of the surface parallel with each other, and successively displaced perpendicularly to the plane of the sections. A separate recording can be made representing the amount of displacement between successive sections.

It may also be desired to record a programme for a three-dimensional line, and then the follower may be arranged to trace a representation of the projection of the line in one plane, while a second follower traces the pojection of the line in another plane by movement in, or parallel to, the other plane.

Even when a solid surface is to be traced by following representations of successive sections of the solid; instead of following separately-drawn curves, a solid model may be made and the follower may then be arranged to trace the outline of the successive sections of the model.

The invention also includes a record obtained by a method as defined, and in particular such a record on magnetic tape.

It is possible that the speed of reproducing the recorded programme may be intended to be different from the speed at which the programme is recorded, and also that the reproduced curve from the recording shall be to a different scale from that of the representation used in making the recording.

The invention may be carried into practice in various ways and one embodiment together with some modifications will now be described by way of example with reference to the accompanying drawings in which.

Figure 5:
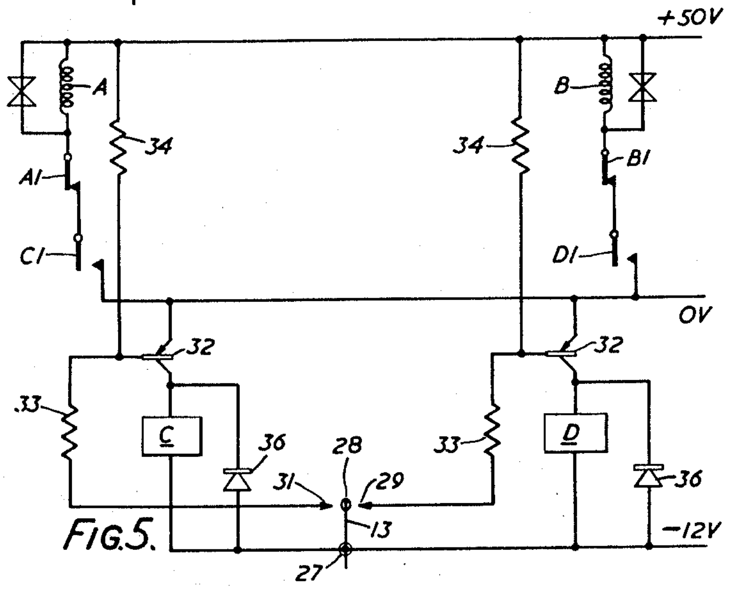
FIGURE 5 is a diagram of a circuit for controlling the movement of the driving wheel in accordance with the position of the stylus in relation to the curve.

The curve 11 to be followed is drawn as a groove in a wax, plastic, or soft metal plate which is fixed to a base 12, and above the plate is mounted a line-follower including a stylus 13 (FIGURES 2, 3 and 5) mounted in a head 14 supported from a follower carriage 15 which is mounted on low-friction bearings 16 to be capable of movement along parallel X-guide arms 17 which are themselves part of a second carriage 18 which can move on low-friction bearings 19 along Y-guide arms 21, the X- and Y-guide arms being perpendicular with each other and parallel with the base 12.

The follower carriage 15 and the second carriage 18 each incorporate a reading head 22 arranged to give electrical signals dependent upon the relative displacement of the respective carriage along its guide arms. The reading heads are conveniently of the kind described in British patent specification No. 27,148/59.

The stylus 13, and with it the carriages 15 and 18 are driven by means of differentially-driven wheels 23, on a horizontal axle 24, and in contact with the plate, which wheels are in turn driven by a motor 25 at a speed representing the desired cutting speed of the machine tool. The wheels move over the table by friction, and drive the carriages with them. The carriages are steered by rotation of the wheels 23 about a vertical axis 26, in order that the stylus can follow the groove.

Figure 2:
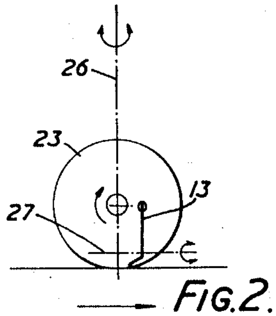
FIGURE 2 is a diagrammatic elevation of a driving wheel and stylus used in the follower of FIGURE 1.
Figure 3:
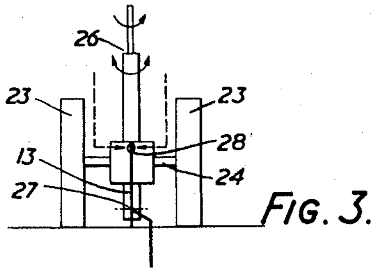
FIGURE 3 is a diagrammatic end elevation of the wheel and stylus of FIGURE 2.

The stylus 13 itself is pivoted near its lower end about a horizontal axis 27 parallel with the direction of movement, and has at its upper end a moving contact 28 which can move to one side or the other to make with either of two fixed contacts 29 and 31 according to the sense of stylus deflection about its horizontal axis 27 if this axis moves away from its desired position immediately above the groove. The stylus 13 is mounted slightly ahead of the steering axis 26 as shown in FIGURE 2 to give steering sense and thus to help to stabilise the steering system.

Each of the two fixed contacts 29 and 31 is connected to the base of one of a pair of transistors 32, which base normally carries positive supply potential, and holds the transistor cut off. When however, the stylus contact is made, the base is connected through a resistor 33 to the negative supply, and a potential divider comprising the resistor 33 and a resistor 34 is arranged so that the potential on the base allows the transistor 32 to become conducting. The load current path of each transistor includes the coil of a relay C or D in parallel with a rectifier 36, and the contact of which is in series with one of a pair of steering coils A and B and the supply.

The shaft 26 about which the driving wheels 23 can be turned for steering carries at its upper end a toothed wheel 38, which is normally restrained against rotation by a spring loaded detent 39 which engages one of the teeth. Each of the steering coils A and B is associated with an armature 41 carrying a striker 42 so that when the respective steering coil is energised, the striker moves away from the periphery of the toothed wheel against a spring 43. This movement is arranged to open a pair of normally closed contacts $A_1$ and $B_1$ connected in series with the operating coil A or B, so that the steering coil becomes de-energised, and the spring 43 causes the striker 42 to move back against the periphery of the toothed wheel, and it is arranged that this movement turns the wheel 38 through the angle corresponding to the angular width of one tooth. When this movement has been completed, the normally-closed contact $A_1$ or $B_1$ closes again, so that the operating coil A or B is re-energised, and the process is repeated as long as the relays C or D remain energised.

This action continues tooth by tooth until the turning of the driving wheels 23, which are being continuously driven, restores the stylus 13 to alignment with the groove 11 and the stylus contact 28 opens to cut off the transistor 32 and to de-energise its relay C or D.

It will be appreciated that each set of fixed contacts 31 or 29, transistor 32, relay C or D, steering coil A or B, armature 41, striker 42, spring 43 and normally-closed contacts $A_1$ or $B_1$, appertains to wander off the stylus to a different side of the groove. It follows that the wheels will be steered to follow the groove, and that the carriages 15 and 18 will follow this movement so that appropriate X and Y deflection signals are produced and can be recorded.

For this purpose, the X and Y signals for the heads 22 are fed into an electronic unit 46, which produces phase-modulated square wave X and Y outputs and a reference square wave for recording on the three tracks of a tape 47. The electrical components of the steering system may be included in this electronic unit if desired. Power supplies for the heads 22, the motor 25, and the steering control circuit (FIGURE 5) are obtained from the unit 46 and supplied over the conductors 50 in FIGURE 1.

It is easy to see how by following the representation of the desired curve defined by the groove 11 an appropriate recording of the necessary programme for machining can be produced.

Three possible modifications are conveniently referred to here.

The contacts of the relays C and D operated by the stylus can be arranged to drive current one way or the other through the armature of a D.C. motor for driving the steering wheels when the stylus contacts are closed. When the stylus contacts are open, no armature current flows.

Again the moving contact 28 associated with the stylus 13 can be replaced by an iron armature and each of the fixed contacts 29 and 31 can be replaced by an exciting winding and a pick-off winding. The iron armature is arranged to vary the reluctance differential between the exciting windings and the corresponding pick-off windings. If the exciting windings are energised with an out of phase A.C. signal, and the pick-off windings, are suitably connected, the resulting pick-off signal is an A.C. signal of variable amplitude whose phase changes at zero amplitude. This signal can be amplified and used to control a conventional A.C. steering servo.

Alternatively the moving contact 28 can be replaced by a moving coil or condenser plate, and the fixed contacts by moving coils or condenser plates which are energised with out of phase signals, so that the moving coil or plate will pick up a sinal which when amplified can also be used to control a conventional A.C. steering servo.

If the follower runs off track excess stylus deflection or the signal derived from it can be used to shut down the steering and drive motors.

Detectors may be mounted near the stylus to detect marks or other indications on the drawing to initiate stopping or other ancilliary operations.

In general, it is desirable that the driving wheel shall be rotated at constant speed representing a constant machining speed in the final machining operation, but any desired acceleration, and deceleration can be allowed for by controlling the speed of the driving motor during the tracing operation, for example, by setting a potentiometer.

The linear dimensions of the reproduction can be scaled up or down by appropriate electronic sub-division of the reading head signal before recording. For example if the reproduction is five times the size of the desired reproduction, the switching frequency of the reading head can be made five times the required tape carrier frequency and the reading head signal can be divided by five. The same effect can be achieved without frequency division (or multiplication for scaling up), by using scales of different pitch on the X and Y axes on the following table, and on the machine tool.

Ancillary functions can be recorded on the tape by varying the mark/space of the X and Y tracks (and the Z track if any) or by adding high frequency signals to these tracks.

Cutter radius compensation signals can be obtained from a potentiometer geared to the steered wheel shaft 26 and recorded on the tape as explained in U.S. patent application Ser. No. 220,796 filed Aug. 31, 1962.

The time for recording can be made shorter than the time for reproduction on the machine tool, for example, it can be halved by doubling the wheel-drive velocity, and making the tape recording speed double the speed at which it will be played back.

Figure 6:
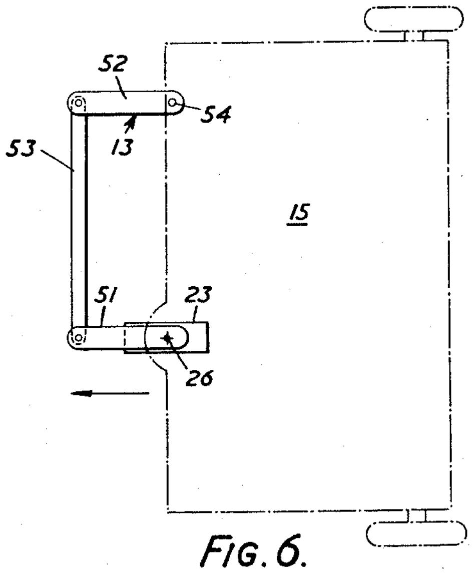
FIGURE 6 is a diagrammatic plan view showing how the recording can have automatically added to it compensation for a certain radius of the machine tool cutter.

It is clear that during reproduction, the portion of the axis of the cutter can be most easily controlled, but that this will be displaced from the desired curve by the radius of the cutter. An alternative carriage arrangement enabling compensation to be made for cutter radius while the recording is being made is shown in FIGURE 6

Here the steering wheel is shown as a single wheel 23 rotatable on a vertical shaft 26 in a bearing in the carriage 15. The shaft carries a link 51 which is maintained in line with the direction of movement of the carriage produced by rotation of the driving and steering wheel 23, and this link 51 together with a parallel link 52 of equal length forms a parallelogram, the other two sides of which are respectively a radius arm 53 joining the free ends of the links 51 and 52 and a base line on the carriage 15 joining the centre of the bearing for the shaft 26 to a pivotal connection 54 for the link 52. The stylus 13 is carried on the link 52 a little displaced in front of the pivot point 54. The length of the radius arm 53 represents the desired amount of cutter radius compensation and the system operates to rotate the wheel 23 on its shaft 26, so that it steers the carriage 15 in an appropriate path such that the follower 13 follows the curve. The path of movement of the carriage which is recorded represents the desired cutter centre path allowing for the cutter radius. The link arrangement with the stylus 13 displaced from the pivot 54 gives steerage sense and stability.

Figures 1, 4:
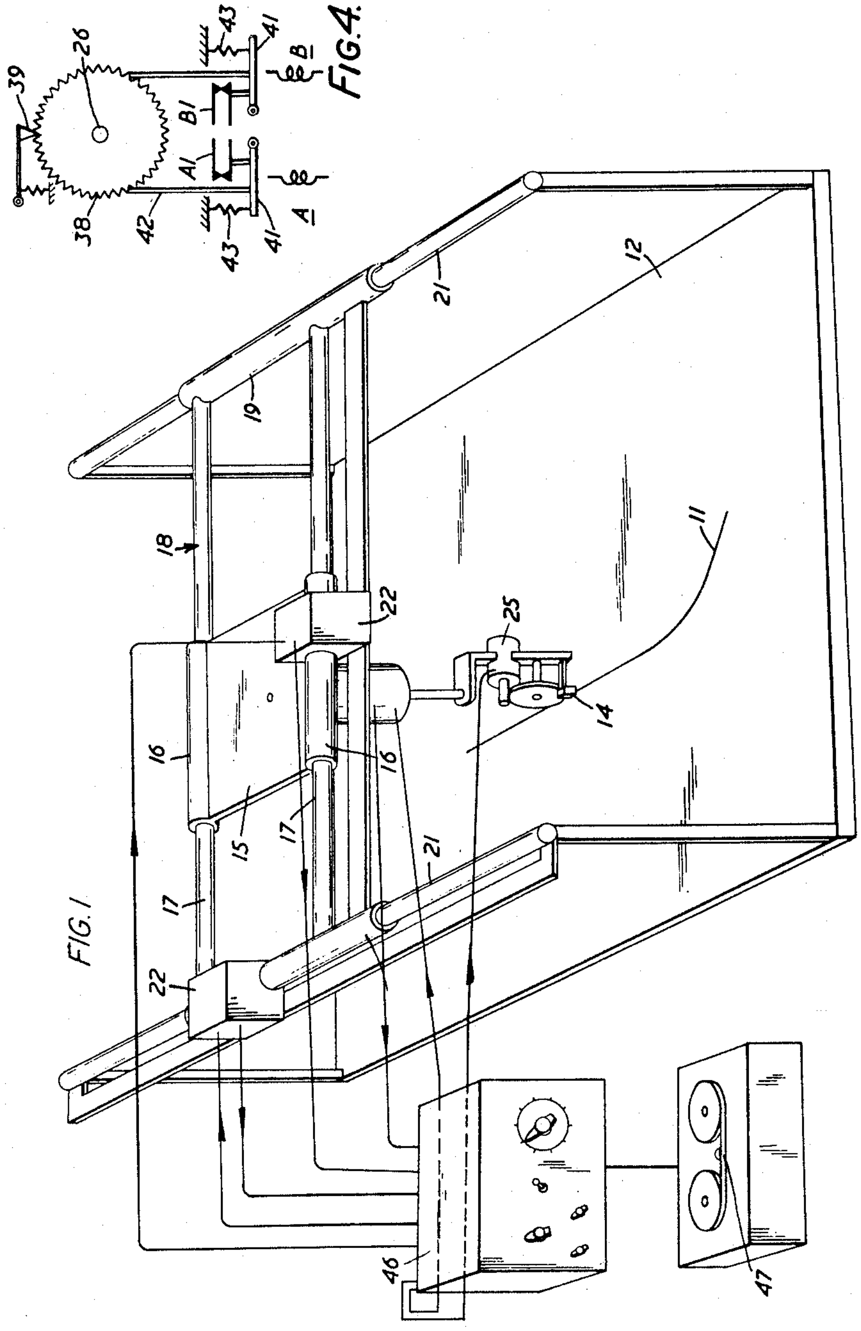
FIGURE 1 is a perspective view of an equipment for recording on magnetic tape a programme to be followed by a machine tool in causing its cutting tool to follow a predetermined curve.
FIGURE 4 is a diagrammatic plan of mechanism for controlling the steering of the driving wheel.

If the carriage movement is detected in relation to two directions at right angles as described with reference to FIGURE 1, the cutter radius compensation signals will be automatically included as a part of the recording. However, if necessary, they can be provided separately, in the manner described in British patent specification No. 2,783/62 by rotating the sliders of a sine and a cosine potentiometer by a drive from the shaft 26. The potentiometers are suitably energised and X and Y cutter radius compensation signals obtained from the sliders are recorded on separate tracks or are superimposed on the separately recorded X and Y position signals.

It was suggested in the introduction to this specification that for generating a programme representing a solid surface, successive contours of the surface spaced apart by small amounts in the direction of the Z axis can be drawn, and traced in turn. The Z axis movement then can be entered manually on the recording by phase shifting the Z axis signal.

However, it may be that a line in three dimensions is required to be traced, and this may be done by representing the projection of the line in the $X/Y$ plane, and following this in the way described above, while an arm on the Y reading head causes a second follower to move over a representation of a projection of the curve in the $Y/Z$ plane and correctly orientated with respect to the $X/Y$ representation. It is only necessary for the arm carrying the second follower to move forwards and backwards in the $Y/Z$ plane. In this way the driving wheel is replaced by a free wheel on the second follower.

Again, if a solid model is available it can be followed by a ball-ended probe of radius equal to the cutter radius.

Alternatively, the stylus may be mounted vertically on the top of the curve follower carriage while the driving wheel runs over the table, the stylus contact being spring biassed to make the wheel steer towards the model which is mounted upside down on the underside of a table over the curve-following table. The method of following is very similar to that described above for each horizontal section of the model. When a successive section is to be traced a step measuring system on the probe is used to give Z step signals for recording on another track.

What I claim as my invention and desire to secure by Letters Patent is:

1. Apparatus for controlling a curve following operation comprising a carriage, a stylus on the carriage, steerable drive mechanism for moving the carriage in relation to the apparatus, and a steering device for the mechanism for controlling the direction of movement of the carriage, a transducer arranged to generate signals in response to deviation of the stylus from a line representing the curve to be followed, means for controlling the steering device in response to signals from the transducer to cause the mechanism to be driven in the direction which causes the stylus to follow the line, means for generating signals representing the locus of the carriage in relation to coordinates as the line is followed and means for recording the said locus signals.

2. Apparatus as claimed in claim 1 in which the drive mechanism comprises a steerable drive wheel in frictional driving contact with a surface carrying the line.

3. Apparatus as claimed in claim 1 in which the recording means comprises magnetic tape recording apparatus.

4. Apparatus as claimed in claim 3 including means for simultaneously generating signals representing compensation for the radius of a cutter for reproducing the curve.

5. Apparatus as claimed in claim 4 including a support enabling the transducer to be displaced from the stylus in a direction at right angles to the direction of movement of the carriage for generating the compensation signals.

6. Apparatus as claimed in claim 5 including means for adjusting the displacement of the transducer from the stylus.

7. Apparatus as claimed in claim 6 including an arm on the carriage mounted at right angles to the direction of movement to the carriage and carrying at its free end and the stylus.

8. Apparatus for controlling a curve following operation comprising a steerable carriage mounted to be movable in relation to a line representing a curve to be followed, means for driving the carriage, a line follower supported by the carriage, detector means of the necessary movements of the carriage when the follower follows the line, which detector means produce signals representing the said necessary movements, means responsive to said signals for steering said carriage along said line, and means for recording the signals.

9. Apparatus as claimed in claim 8 in which the driving means comprises a steerable driving wheel in frictional driving contact with a surface carrying the line.

10. Apparatus as claimed in claim 8 in which the recording means is magnetic tape recording apparatus.

11. Apparatus as claimed in claim 8 including means for simultaneously generating signals representing compensation for the radius of a cutter for reproducing the curve.

12. Apparatus as claimed in claim 11 including a transducer arranged to detect displacement of the follower from the line, a support enabling the transducer to be displaced from the follower in a direction at right angles to the direction of movement of the carriage for generating the compensation signals.

13. Apparatus as claimed in claim 12 including means for adjusting the displacement of the transducer from the follower.

14. Apparatus as claimed in claim 11 including an arm on the carriage mounted at right angles to the direction of movement to the carriage and carrying the follower at its free end.

References Cited by the Examiner

UNITED STATES PATENTS

| | | | |
|---|---|---|---|
| 2,423,440 | 7/47 | Neergaard | 346—33 |
| 2,503,052 | 4/50 | Keinath | 346—33 |
| 2,861,234 | 11/58 | Martin et al. | 346—33 |
| 2,941,135 | 6/60 | Anderson | 346—33 |
| 2,996,348 | 8/61 | Rosenberg | 346—33 |
| 3,024,396 | 3/62 | Peckjian | 346—33 |
| 3,140,911 | 7/64 | Johnston | 346—33 |

LEYLAND M. MARTIN, *Primary Examiner.*

LEO SMILOW, *Examiner.*